United States Patent
Niessen et al.

(10) Patent No.: US 7,036,626 B2
(45) Date of Patent: May 2, 2006

(54) VEHICLE STEERING SYSTEM FOR CONTROLLING A STEERING OR STEERING LOCK ANGLE OF AT LEAST ONE WHEEL OF A VEHICLE

(75) Inventors: Harwin Niessen, Kirchheim u. Teck (DE); Hremann Henrichfreise, Bergisch Gladbach (DE)

(73) Assignee: Thyssenkrupp Presta Steertec GmbH, (DE)

( * ) Notice: Subject to any disclaimer, the term of this patent is extended or adjusted under 35 U.S.C. 154(b) by 0 days.

(21) Appl. No.: 10/473,444

(22) PCT Filed: Feb. 21, 2002

(86) PCT No.: PCT/EP02/01855

§ 371 (c)(1),
(2), (4) Date: Sep. 26, 2003

(87) PCT Pub. No.: WO02/076806

PCT Pub. Date: Oct. 3, 2002

(65) Prior Publication Data
US 2004/0084241 A1  May 6, 2004

(30) Foreign Application Priority Data
Mar. 27, 2001 (DE) ................................ 101 15 018

(51) Int. Cl.
*B60D 5/04* (2006.01)

(52) U.S. Cl. ...................................... 180/446; 180/443

(58) Field of Classification Search ................. 180/446, 180/443; 701/41, 42
See application file for complete search history.

(56) References Cited

U.S. PATENT DOCUMENTS

| | | | | |
|---|---|---|---|---|
| 4,940,105 A | * | 7/1990 | Matsunaga et al. | 180/404 |
| 6,736,236 B1 | * | 5/2004 | Kurishige et al. | 180/446 |
| 6,768,283 B1 | * | 7/2004 | Tanaka et al. | 318/632 |
| 6,799,656 B1 | * | 10/2004 | Kimura et al. | 180/446 |

FOREIGN PATENT DOCUMENTS

| | | |
|---|---|---|
| DE | 196 26 540 | 11/1997 |
| DE | 197 55 044 | 3/1999 |
| EP | 1 172 280 | 1/2002 |

* cited by examiner

*Primary Examiner*—Tony Winner
(74) *Attorney, Agent, or Firm*—Robert W Becker & Associates; Robert W Becker

(57) ABSTRACT

A vehicle steering system for controlling a steering or steering lock angle of at least one wheel of a vehicle having a steering handle or wheel, whereby the actual manual torque or force that is to be applied by the driver for controlling the vehicle being regulated by a control device is a function of the vehicle condition or state values.

16 Claims, 4 Drawing Sheets

VEHICLE STEERING SYSTEM FOR CONTROLLING A STEERING OR STEERING LOCK ANGLE OF AT LEAST ONE WHEEL OF A VEHICLE

BACKGROUND OF THE INVENTION

The present invention relates to a vehicle steering system for controlling a steering or steering lock angle of at least one wheel of a vehicle having a steering handle, in particular a steering wheel, with a detection device being provided for recording the degree of actuation of the steering handle, with a mechanical actuation link being provided between the steering handle and at least one steered vehicle wheel, with an actuator being provided to provide supported adjustment of the steering or steering lock angle, and with a control device being provided for the actuator, whereby the actual manual torque or force that is to be applied by the driver for controlling the vehicle being regulated by the control device as a function of the vehicle condition or state values.

With hydraulic power-assisted steering systems, as a rule a control valve controls an oil pressure in the steering cylinder in a manner corresponding to the rotary movement of the steering wheel. An elastic torque-measuring element, such as a torsion bar, helical spring, or leaf spring, converts the torque engaging at the steering wheel into a control travel movement. By means of the control travel, control edges designed as bevelled or chamfered elements or facets are displaced, and so form the corresponding aperture cross-section for the oil flow.

With power-assisted steering systems in which the supporting torque is created by means of an electric motor as an actuator, a torque-measuring device likewise serves as a rule for measuring the manual torque applied by the driver.

Increasing demands with regard to the operating convenience of power-assisted steering and the safety of the vehicle have led to the introduction of parameterable power-assisted steering systems. These work, for example, as a function of the speed; i.e. the travel speed displayed by the electronic tachometer controls or influences the actuation force to be applied to the steering wheel or the steering handle by the driver. A control device assesses the speed signals and determines the value of the supporting torque to be adjusted, which is required by the actuator to provide the supportive setting of the steering or steering lock angle. In this way, the special design of the steering characteristics can lead to the situation in which, when carrying out parking maneuvers and when turning the steering wheel while stationary, only minimal force is to be applied to the steering wheel, while with increasing speed of the vehicle the amount of the assistance force and assistance torque is reduced. Accordingly, at high speeds exact and precisely-aimed steering is made possible.

A disadvantage of the known power-assisted steering systems is the fact that the manual torque applied to the steering handle or steering wheel is measured and only passed on to the actuator device with amplification. As a result of this, only an inadequate degree of operating comfort and convenience is attained. With these systems, as a rule, the active return, i.e. the return of the released steering wheel to the central setting, is implemented explicitly by means of an additional control device, as a result of which the entire regulation/control of the system is complicated and prone to failure. The implementation of active damping or attenuation can only be achieved in the conventional systems with substantial effort and in most cases is unsatisfactory. In addition, a disadvantage of these systems that friction compensation, i.e. the taking into consideration of the friction present in the steering system, may not be considered, or only insufficiently. By the implementation of the options referred to above, the controller is in most cases so complex that it can only be optimized with great effort, if at all.

The object of the present invention is to provide a vehicle steering system which is easier to optimize, in which the manual torque to be applied by the driver can be predetermined and, in particular, can be precisely adjusted.

SUMMARY OF THE INVENTION

The essential thinking behind the invention is that a state or condition regulator creates a setting value $T_{req}$ for the control device by means of state values from the vehicle, in which the steering forces to be applied by the driver would be minimal, with the result that a steering system would be created which would as far as possible be torque-free. Taking torque-free steering as a starting point, a guide value $T_{ref}$ can be easily totaled up from the setting value $T_{req}$, without any consideration needing to be paid, during the calculation or determination of the manual torque to be applied by the driver, to the vehicle state values which are otherwise to be considered. As a result it is possible advantageously for the torque applied by the driver to be actively predetermined and not, as with the prior art, only the manual torque actually measured being taken for the calculation of the degree of amplification required to support the driver. An alternative solution to engaging a guide value is derived if the setting value $T_{req}$ is multiplied by a proportionality factor, which in turn is dependent on various different values such as the travel speed and the sensor torque moment.

Thus, for example, the manual torque to be applied by the driver, $T_{driver,req}$, can be a function of the following parameters: Steering wheel angle, vehicle speed, interference forces acting on the vehicle steering, such as tie rod forces and forces on the tires or reaction forces between the tires and the carriageway, various dynamic travel information from the travel systems located in the vehicle, in particular the transmission and/or the travel dynamics regulation system.

It is self-evident that the function referred to above does not have to take account of all the parameters listed. All these parameters can be considered individually or in different combinations. It is likewise possible advantageously for the vehicle driver to specify for the steering in advance that he wishes to drive in a sporty, comfortable, or energy-saving manner. By means of such advance instructions, the actively specified manual torque required, $T_{driver,req}$, can be calculated differently for the individual driving situations and precisely predetermined.

It is, however, advantageous if at least some of the parameters indicated are taken into account for the function of the manual torque to be applied.

The actively specified manual torque required, $T_{driver,req}$, can also be calculated by the multiplication of $T_{friction}$ by a proportionality factor $k_{assist}$, which can, for example, be the vehicle speed values $v_{vehicle}$ and the sensor torque $T_{sensor}$.

Advantageously the control device of the steering system according to the invention is provided with an observation element, which, by means of a mathematical model of the steering system of the vehicle, calculates the state values of the vehicle which are not measured and/or cannot be measured. Such simulation models exist for every vehicle, with the result that advantageously unnecessary sensors for the determination of road condition values and interference state values can be done away with.

The term road condition values is understood to mean, inter alia, the pinion-side angle velocity $\Omega_{pinion}$, the angle difference between the steering wheel side and pinion side $\Delta\phi$, the angle velocity difference between the steering wheel side and pinion side $\Delta\Omega$, and the torque $T_{motor}$ derived from the actuator. It is self-evident that equivalent values can likewise be taken into consideration for the steering system according to the invention.

The term interference state values is understood to mean, inter alia, the torque $T_{driver}$ applied by the driver, as well as the friction moments engaging on the steering system $T_{friction}$.

To achieve torque-free steering behavior, the state regulators require the road state values and interference state values of the road, i.e. of the steering system, for the feedback or engaging procedures.

Road state values in the sense of the state space theory are, for example:

$$x_p = \begin{bmatrix} \Omega_{pinion} \\ \Delta\varphi \\ \Delta\Omega \\ T_{motor} \end{bmatrix}$$

where
  $\Omega_{pinion}$ is the pinion-side angle velocity,
  $\Delta\phi$ is the angle difference between the steering wheel side and the pinion side,
  $\Delta\Omega$ is the angle velocity difference between the steering wheel side and the pinion side,
  $T_{motor}$ is the torque emitted by the actuator.

The following can be regarded as interference state values, for example:

$$x_d = \begin{bmatrix} T_{driver} \\ T_{friction} \end{bmatrix}$$

where
  $T_{driver}$ is the torque applied by the driver
  $T_{friction}$ is the friction moment engaged at the steering system.

Due to the feedback of the road state values by means of a suitable matrix Kp and the lock-on of the interference states (friction value or interference value compensation) via a suitable matrix Kd, which are calculated by means of a suitable state regulator design with a road model extended by an interference model, provision is made for the selected target values, e.g.

$$y_{po} = \begin{bmatrix} T_{sensor} \\ \Delta\Omega \\ \Delta\alpha \end{bmatrix}$$

to be regulated out to zero by the actuating signal $T_{req}$ produced by the controller. These target values are freely selectable, but must be dependent on the road states. In the equation above, the target value $T_{sensor}$ for the realization of torque-free control, the target values $\Delta\Omega$ and $\Delta\alpha$ serve to achieve active oscillation damping, which accordingly allows "torque-free" steering to be achieved.

BRIEF DESCRIPTION OF THE DRAWINGS

A number of basic interconnections of the invention are explained in greater detail hereinafter, on the basis of drawings.

These show.

DESCRIPTION OF PREFERRED EMBODIMENTS

Figure 1:
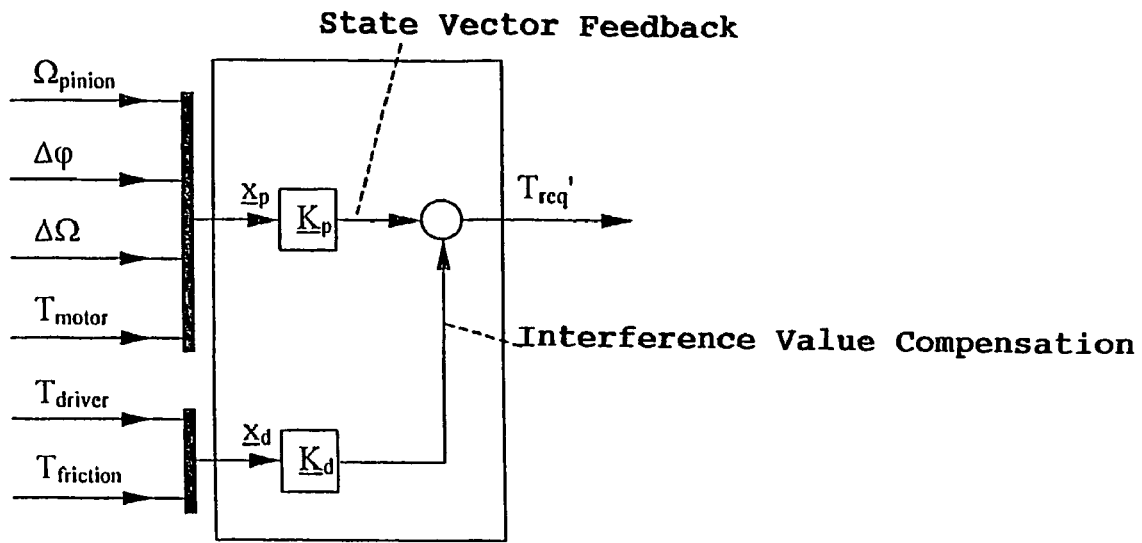
FIG. 1: A diagrammatic representation of the realization of a torque-free vehicle steering system.

FIG. 1 shows a diagrammatic representation of the realization of a torque-free vehicle steering system by state vector feedback with interference value compensation.

Once torque-free steering has been achieved, a desired steering sensitivity can be obtained by means of a guide value model. The term steering sensitivity in this context is understood to mean the manual torque felt by the driver or to be applied by the driver. To do this, the value $T_{ref}$ is generated from the manual torque $T_{driver,req}$ to be felt by the driver by means of a guide value lock-on with matrix Kr, and totaled to form the adjustment parameter $T_{req}$.

Figure 2:
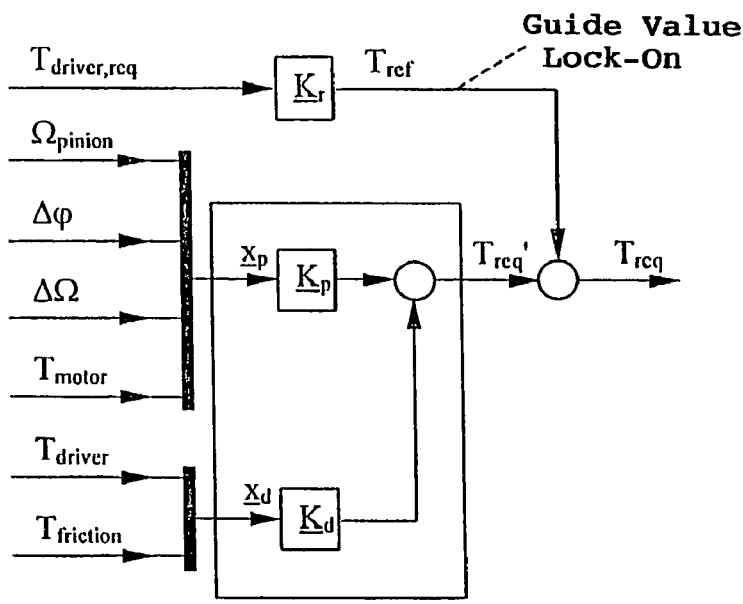
FIG. 2: A guide value lock-on arrangement according to the invention.

FIG. 2 shows the guide value lock-on and the summation of the values $T_{req}$ and $T_{ref}$ to $T_{req}$, whereby $T_{req}$ is an adjustment parameter for the control device of the actuator.

The target values to be weighted therefore become:

$$y_w = \begin{bmatrix} T_{sensor} - T_{driver,req} \\ \Delta\Omega \\ \Delta\alpha \end{bmatrix}$$

$T_{driver,req}$ is the torque which the driver feels. In comparison with the target value vector $Y_{po}$, no torque-free steering (i.e. $T_{sensor}=0$) is produced here, but a reduced sensor moment is controlled around the amount of the desired driver torque $T_{driver,req}$. Due to the previously engendered torque-free steering behavior, i.e. the drive sensitivity, i.e. the torque value $T_{driver,req}$, is now a completely freely formable value (independent of the road states), and can be any desired function of the parameters already described.

Because it is not normally possible for all the required state values to be measured, they must be reconstructed from the existing measured values. This can be done, for example, by a differentiating filter or the state observation element already described.

Figure 3:
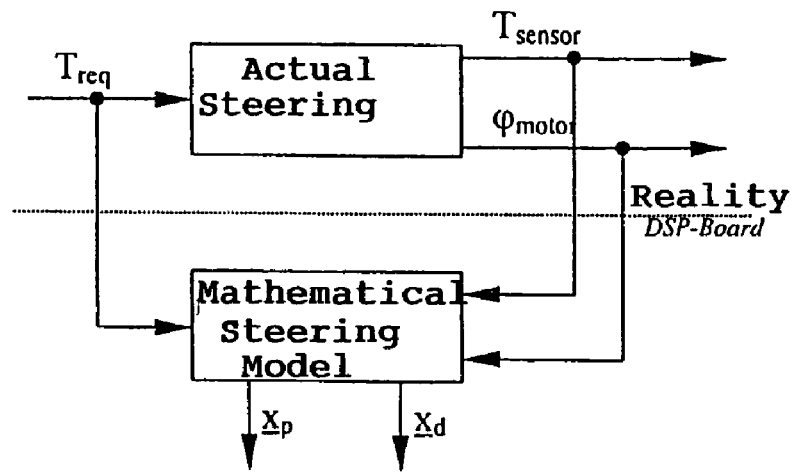
FIG. 3: A state observation element according to the invention.

As FIG. 3 shows, the state observation element can exhibit a mathematical parallel model of the road, extended by an interference model, and receives as input values the adjustment parameter $T_{req}$ generated by the controller, as well as the measured values which are in fact present, such as the torque $T_{sensor}$ and the engine angle $\phi_{motor}$.

By means of the feedback of the differences from the calculated measured values and the actual measured values via a suitable matrix, the missing state values can be determined. The calculation of this matrix can be determined by means of a suitable observation arrangement.

By interconnecting the observation element and the controller, a control arrangement can be derived for friction compensation, freely adjustable driver sensitivity and active oscillation damping.

Figure 4:
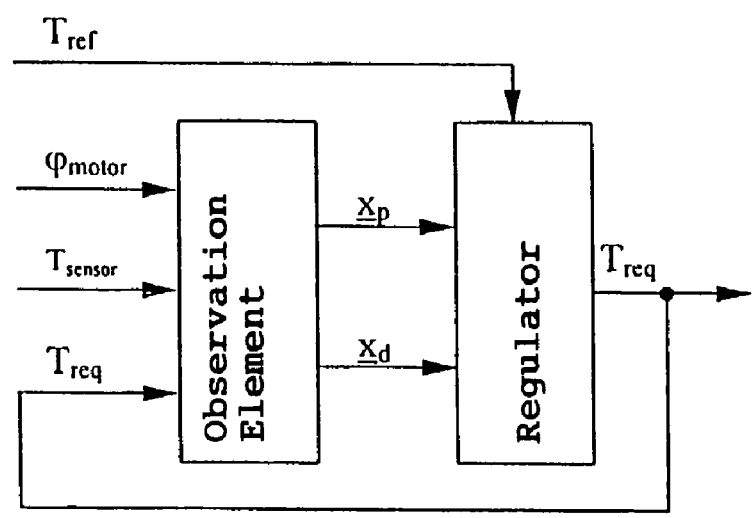
FIG. 4: Function blocks of the control concept according to the invention.

FIG. 4 shows functional blocks of the control concept according to the invention for the vehicle steering system. The observation element determines the input values required for the controller. By simultaneous guide value lock-on of $T_{driver,req}$, the controlling system controls the adjustment parameter $T_{req}$ in accordance with the manual sensitivity or manual torque which is to be set.

As has already been explained, $T_{req}$ is the adjustment parameter for the control device of the actuator. Thanks to the advantageous modular arrangement of the vehicle steering system according to the invention and its control concept, it is possible to implement the concept according to the invention in any vehicle without problem. The control layout in this situation is very simple in design, since as a rule the mathematical models for the individual vehicles are known.

As a result of the fact that a torque-free steering system is put into effect first, it is possible without any problem for a function developed for a particular vehicle for the drive sensitivity or manual torque to be applied by the driver to be adopted for another vehicle. It is therefore possible for different vehicles to be equipped with exactly the same drive sensitivity.

The control concept represented in the drawings is only one possible embodiment of the vehicle steering system according to the invention. It is of course possible for the summation of $T_{ref}$ and $T_{req}$ to be effected at another point. For example, the individual matrices Kr, Kp, and Ka can naturally be combined into one single matrix without departing from the concept according to the invention.

Figure 5:
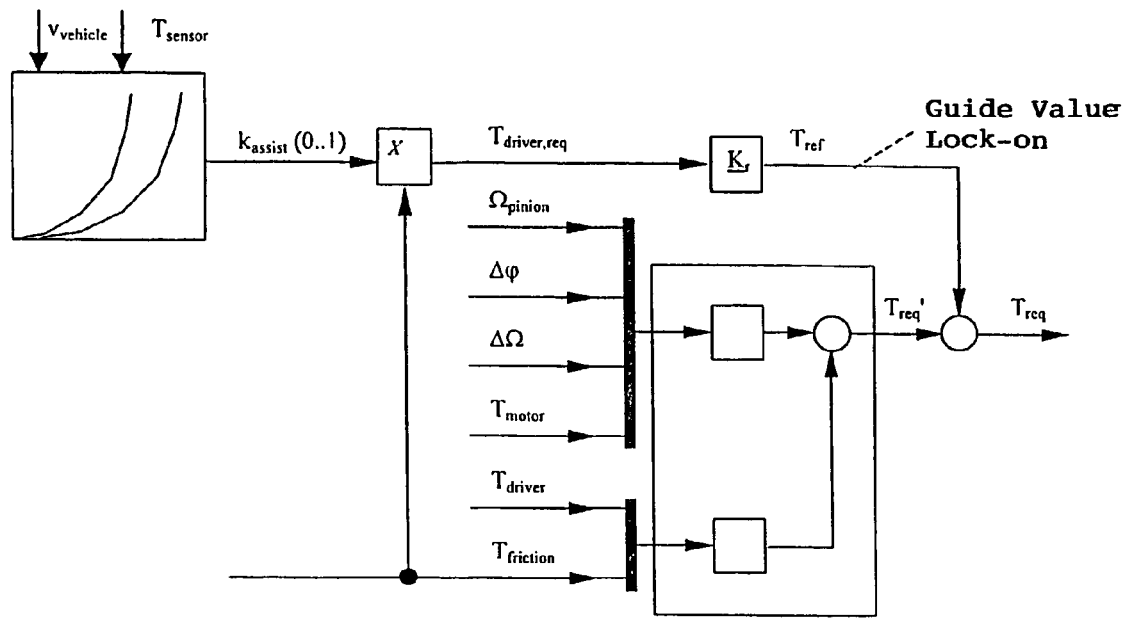
FIG. 5: An alternative solution for the generation of the desired driver torque $T_{driver,req}$.

FIG. 5 shows an alternative means of generating the desired driver torque $T_{driver,req}$, whereby the desired driver torque $T_{driver,req}$ is derived by the multiplication of $T_{friction}$ by a proportionality factor $k_{assist}$. The factor $k_{assist}$ is in turn a function of different values such as, for example, the vehicle speed $v_{vehicle}$ and the sensor torque $T_{sensor}$.

Figure 6:
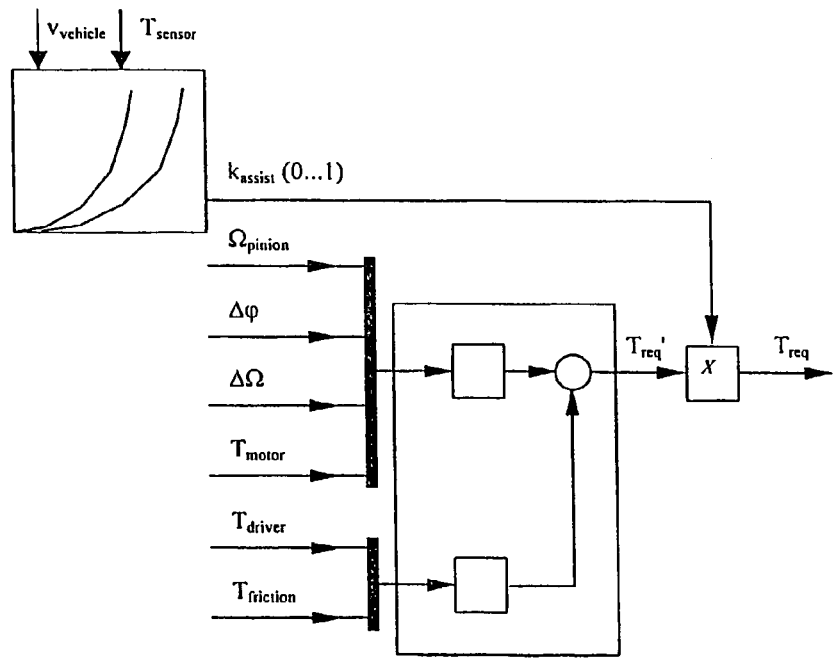
FIG. 6: An alternative solution for the guide value lock-on according to FIGS. 3 and 5.

As an alternative to the guide value lock-on, it is likewise in the sense of the invention if the value $T_{req}$ is multiplied by a proportionality factor. This proportionality factor can be $k_{assist}$, as shown in FIG. 6.

The specification incorporates by reference the disclosure of German priority document 101 15 018.0 filed Mar. 27, 2001 and PCT/EP02/01855 filed Feb. 21, 2002.

The present invention is, of course, in no way restricted to the specific disclosure of the specification and drawings, but also encompasses any modifications within the scope of the appended claims.

Figure 7:
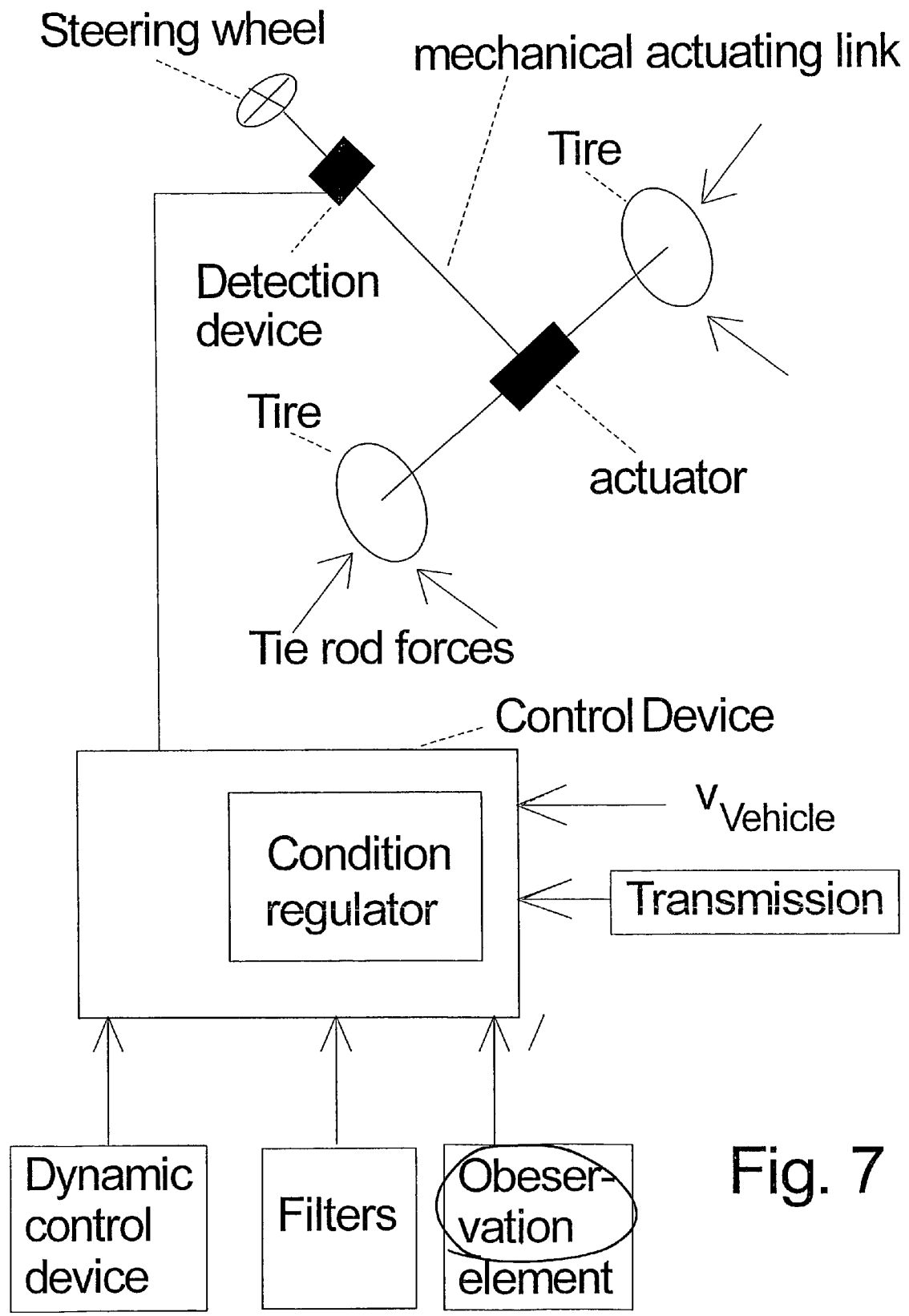
FIG. 7: Function blocks showing interaction of parameters such as steering wheel angle, vehicle speed, interference forces acting on the vehicle steering, such as tie rod forces and forces on the tires or reaction forces between the tires and carriageway, and various dynamic travel information from the travel systems, in particular the transmission, as fed into a condition regulator to create a setting value $T_{req}$ for the control device.

As shown in FIG. 7, the control values obtained from the various parameters discussed supra, including steering wheel angle, vehicle speed, interference forces acting on the vehicle steering, such as tie rod forces and forces on the tires or reaction forces between the tires and carriageway, various dynamic travel information from the travel systems located in the vehicle, in particular the transmission and/or the travel dynamics regulation system, can be presented to a condition regular to create the setting value $T_{req}$ for the control device wherein steering forces to be applied by the driver would be minimal.

The invention claimed is:

1. A vehicle steering system for controlling a steering or steering lock angle of at least one wheel of a vehicle having a steering means, comprising:
    a detection device for recording a degree of actuation of the steering means;
    a mechanical actuation link between the steering means and at least one steered vehicle wheel;
    an actuator to provide supported adjustment of a steering or steering lock angle; and
    a control device for said actuator, wherein an actual manual torque or force that is to be applied by a driver to control said vehicle is regulated by said control device as a function of vehicle condition values, wherein said control device has a condition regulator, which generates an adjustment parameter $T_{req}$ for said control device by means of condition values of the vehicle, wherein steering forces to be applied by said driver would be minimal, so that a most torque-free possible steering would be achievable, and wherein a reference value lock-on for a manual torque $T_{driver,req}$ to be applied by the driver produces a guide value $T_{ref}$.

2. A vehicle steering system according to claim 1, wherein multiplication of a value $T_{friction}$, which represents friction moments engaging on steering, with a variable proportionality factor $k_{assist}$, produces said manual torque to be applied by the driver, $T_{driver,req}$.

3. A vehicle steering system for controlling a steering or steering lock angle of at least one wheel of a vehicle having a steering means, comprising:
    a detection device for recording a degree of actuation of the steering means;
    a mechanical actuation link between said steering means and at least one steered vehicle wheel;
    an actuator to provide supported adjustment of a steering or steering lock angle; and
    a control device for the actuator, wherein an actual manual torque or force that is to be applied by a driver to control said vehicle is regulated by said control device as a function of vehicle condition values, wherein said control device has a condition regulator, which generates an adjustment parameter $T_{req}$ for said control device by means of condition values of said vehicle, wherein steering forces to be applied by said driver would be minimal, so that a most torque-free possible steering would be achievable, and in that a guide value $T_{ref}$ is generated by multiplying said adjustment parameter $T_{req}$ by a proportionality factor $k_{assist}$.

4. A vehicle steering system according to claim 3, wherein said proportionality factor $k_{assist}$ is a function of vehicle speed and a sensor torque $T_{sensor}$.

5. A vehicle steering system according to claim 3, wherein said control device has an observation element which, by means of a mathematical model of said steering system of said vehicle, determines condition values of said vehicle which are not measured and/or cannot be measured.

6. A vehicle steering system according to claim 3, wherein for calculation of $T_{req}$, road condition values and interference condition values are taken into consideration.

7. A vehicle steering system according to claim 6, wherein said road condition values are, for example, a pinion-side angle velocity $\Omega_{pinion}$ and/or an angle difference between a steering wheel side and a pinion side $\Delta\phi$ and/or an angle velocity difference between said steering wheel side and said pinion side $\Delta\Omega$ and/or a torque $T_{motor}$ issued by said actuator, and/or equivalent values.

8. A vehicle steering system according to claim 6, wherein interference condition values are a torque $T_{driver}$ applied by a driver and/or a friction torque $T_{friction}$ engaging on said steering system.

9. A vehicle steering system according to claim 3, wherein said adjustment parameter $T_{req}$ is generated by feedback of road condition values by means of a suitable matrix Kp and lock-on of interference condition values by means of a suitable matrix Kd.

10. A vehicle steering system according to claim 3, wherein by means of a guide value lock-on in a matrix Kr, a desired manual torque $T_{driver,req}$ is added up to said adjustment parameter $T_{req}$.

11. A vehicle steering system according to claim 10, wherein said desired manual torque $T_{driver,req}$ is a function of a steering wheel angle and/or vehicle speed and/or interference values acting on said vehicle steering system.

12. A vehicle steering system according to claim 10, wherein a desired manual torque $T_{driver,req}$ can be specified by input by a vehicle driver and/or can be influenced thereby.

13. A vehicle steering system according to claim 12, wherein an input for a setting of a driving mode is "economy" or "sport".

14. A vehicle steering system according to claim 10, wherein a desired manual torque $T_{driver,req}$ is a function of various different items of driving dynamic information from various driving systems located in said vehicle, in particular from a transmission and/or a vehicle dynamics control system.

15. A vehicle steering system according to claim 3, wherein condition values of said vehicle which are not measured are determined by differentiating filters or notified to an observation element.

16. A vehicle steering system according to claim 3, wherein a condition regulator is arranged by means of a quality function element in such a way that an active vibration damping effect is achieved.

* * * * *